United States Patent

Snyder et al.

[11] 3,728,844
[45] Apr. 24, 1973

[54] VAPOR ADSORPTION PROCESS
[75] Inventors: Charles F. Snyder, Conroe, Tex.; Burton M. Casad, Ponca City, Okla.
[73] Assignee: Continental Oil Company, Ponca City, Okla.
[22] Filed: Aug. 19, 1971
[21] Appl. No.: 173,059

[52] U.S. Cl. ......................................... 55/33, 55/62
[51] Int. Cl. ............................................. B01d 53/04
[58] Field of Search .................... 55/33, 62, 74, 179

[56] References Cited

UNITED STATES PATENTS

| | | | |
|---|---|---|---|
| 3,238,701 | 3/1966 | Holt | 55/62 |
| 3,241,294 | 3/1966 | Walker et al. | 55/62 |
| 3,243,938 | 4/1966 | Lavery et al. | 55/62 |

*Primary Examiner*—Charles N. Hart
*Attorney*—Joseph C. Kotarski et al.

[57] ABSTRACT

The present invention relates to an improved vapor adsorption process, and more particularly, to an adsorption process for removing desired components from an inlet gas stream. By the present invention a bed of solid adsorbent is contacted with a selected adsorbable material during the regeneration thereof, which material has the property of being displaced from the adsorbent bed by desired components contained in the inlet gas stream and a heat of desorption equal to or greater than the heat of adsorption of the desired components. When the bed is contacted with the inlet gas stream, desired components contained therein are adsorbed thereby displacing the previously adsorbed selected adsorbable material from the bed which results in the temperature of the bed remaining relatively constant and the utilization of the maximum bed adsorption capacity.

4 Claims, 2 Drawing Figures

Patented April 24, 1973 3,728,844

INVENTORS
BURTON M. CASAD &
CHARLES F. SNYDER

BY Herald F. Floyd
ATTORNEY

VAPOR ADSORPTION PROCESS

BACKGROUND OF THE INVENTION

1. Field of the Invention

The present invention relates to an improved vapor adsorption process and more particularly, but not by way of limitation, to an adsorption process wherein a bed of solid adsorbent is contacted with an inlet gas stream so that desired components are adsorbed on the bed, then contacted by a heated regeneration gas stream so that the desired components are desorbed therefrom and then contacted with a cooling gas stream preparatory to again being contacted with the inlet gas stream.

2. Description of the Prior Art

Many various vapor adsorption processes have been developed of the type wherein one or more beds are utilized for adsorbing desired components from a gas stream while the other beds are being regenerated. In these processes regeneration of the bed or beds which are saturated with desired components is accomplished by heating the bed or beds with a heated regeneration gas stream thereby causing the desired components to be desorbed from the bed. The hot bed is then cooled by contacting it with a cooling gas stream preparatory to again being contacted with the inlet gas stream. The adsorbent beds are continuously switched or cycled so that the bed or beds which have just become saturated with desired components by contact with the inlet gas stream are heated, the bed or beds which have just been heated are cooled, and the bed or beds which have just been cooled are contacted with the inlet gas stream.

A variety of solid adsorbent materials are commercially available for selectively adsorbing desired components from gas streams. For example, solid adsorbents such as activated carbon, activated alumina, silica gel and an adsorbent material marketed under the trade designation "Sorbeads" are commonly used to adsorb hydrocarbon compounds and/or water from natural gas streams.

Adsorption and desorption of components on solid adsorbent are accompanied by heat effects similar in nature to heats of condensation and vaporization. Heat is liberated as a vapor is adsorbed on an adsorbent material (heat of adsorption), and conversely, heat is taken up by a vapor when it desorbs from an adsorbent material (heat of desorption). As a bed of adsorbent material adsorbs desired components from a gas stream the temperature of the bed rises which is detrimental in that the adsorption capacity of the bed decreases with increasing temperature.

Generally, heretofore the temperature rise in an adsorbent bed resulting from the liberation of heat of adsorption has not been provided for, and as a result, less than maximum adsorbent bed capacity has been realized.

By the present invention, a process is provided wherein the temperature of the adsorbent bed adsorbing desired components from a gas stream is maintained at a relatively constant level thereby resulting in increased bed adsorption capacity.

SUMMARY OF THE INVENTION

The present invention relates to a vapor adsorption process wherein a bed of solid adsorbent material is contacted with an inlet gas stream so that desired components contained in the gas stream are adsorbed on the bed, then regenerated by contact with a heated regeneration gas stream so that adsorbed components are desorbed from the bed and by contact with a cooling gas stream so that the bed is cooled preparatory to again being contacted with the inlet gas stream. By the present invention the bed is contacted during the regeneration thereof with a selected adsorbable material, which material has the property of being displaced from the bed by said desired components and a heat of desorption equal to or greater than the heat of adsorption of the desired components so that when the bed is contacted with the inlet gas stream the selected adsorbable material is displaced by the desired components resulting in the temperature of the bed remaining relatively constant.

It is, therefore, an object of the present invention to provide an improved vapor adsorption process.

A further object of the present invention is the provision of an adsorption process for recovering desired components from a gas stream wherein the temperature of the adsorbing bed is maintained at a relatively constant level thereby allowing the utilization of the maximum bed adsorption capacity.

Other and further objects, features and advantages of the present invention will be apparent from the following description of the presently preferred embodiments of the invention, given for the purpose of disclosure and taken in conjunction with the accompanying drawings.

DESCRIPTION OF THE PREFERRED EMBODIMENTS

Figure 1:
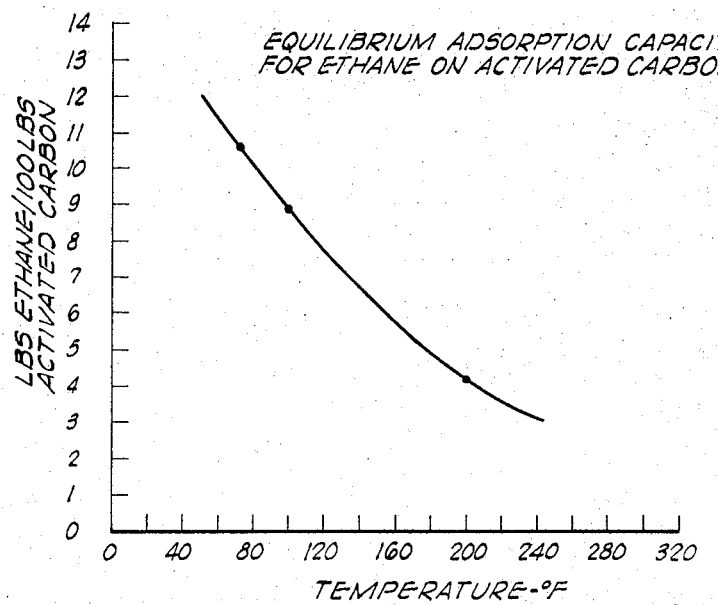
FIG. 1 is a graph showing the equilibrium adsorption capacity for ethane on activated carbon adsorbent material at various temperatures.

It is known that the capacity of adsorbent material to adsorb desired components from a gas stream decreases with increasing temperature. For example, referring to FIG. 1, the equilibrium adsorption capacity for ethane on activated carbon is shown in graphical form. As the temperature of the activated carbon increases, its capacity for adsorbing ethane decreases.

In operation of a vapor adsorption process utilizing one or more beds of solid adsorbent, as the adsorbent is contacted with a gas stream and components from the gas stream are adsorbed thereon, heat is liberated. This heat is commonly referred to as the heat of adsorption, and for a particular component at a given temperature, the heat of adsorption is approximately 1½ times the heat of condensation of that component. The heat of desorption of a component is approximately equal to the heat of adsorption of the component. The heat of adsorption manifests itself in a bed of adsorbent as a temperature rise which in turn results in a reduced total capacity of the adsorbent bed for the adsorbed components.

The present invention is based on the fact that when a component is desorbed from an adsorbent material a heat of desorption is taken up by the component, and the fact that certain components can displace other previously adsorbed components from an adsorbent material.

Specifically, in accordance with the present invention, a bed of adsorbent to be used for adsorbing desired components from a gas stream is first contacted with a selected adsorbable material, which material has the property of being displaced or desorbed by the desired components and which material has a heat of desorption equal to or greater than the heat of adsorption of the desired components. When the bed is subsequently contacted with the gas stream, desired components are adsorbed on the bed and the selected adsorbable material is desorbed therefrom. The heat of adsorption liberated by the adsorption of the desired components is offset by the heat of desorption taken up as a result of the displacement of the selected adsorbable material thereby maintaining the bed of adsorbent at a relatively constant temperature level and allowing the utilization of the maximum adsorption capacity of the bed.

Figure 2:
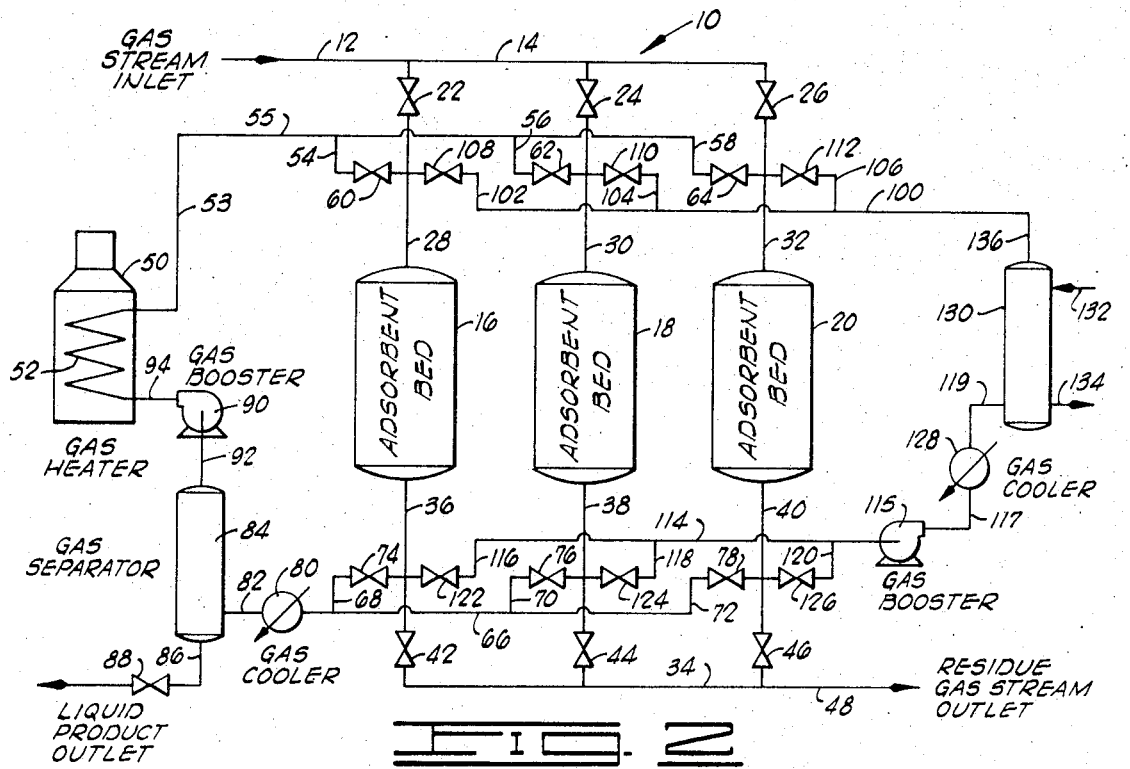
FIG. 2 illustrates one system which may be used for carrying out the process of the present invention in diagrammatic form.

Referring now specifically to FIG. 2, one system which may be utilized for carrying out the improved process of the present invention is illustrated in diagrammatic form and generally designated by the numeral 10. An inlet gas stream containing desired components to be recovered enters the system 10 by way of a conduit 12. The conduit 12 is connected to an inlet gas header 14 from where the inlet gas stream is routed to one of three vessels 16, 18 and 20, each of which contains a stationary bed of solid adsorbent material. Conduits 28, 30 and 32 are connected to inlet connections of the vessels 16, 18 and 20 respectively, and to the inlet gas stream header 14. Valves 22, 24 and 26 are disposed in the conduits 28, 30 and 32. A residue gas outlet header 34 is provided connected to outlet connections of the vessels 16, 18 and 20 by conduits 36, 38 and 40; respectively. Valves 42, 44 and 46 are provided in the conduits 36, 38 and 40. The main residue gas header 34 is connected to a conduit 48 which conducts the residue gas from the system 10 to a point of use or further processing.

A closed regeneration gas stream circuit for continuously heating one of the adsorbent beds contained within the vessels 16, 18 and 20 is provided. A conventional gas stream heater 50 is provided in the regeneration gas stream circuit having a heating coil 52 disposed therein. A regeneration gas stream inlet header 55 is connected to the outlet connection of the heating coil 52 by a conduit 53, and conduits 54, 56 and 58 are connected to conduits 28, 30 and 32 respectively. Valves 60, 62 and 64 are disposed in the conduits 54, 56 and 58 respectively. A regeneration gas stream outlet header 66 is provided for receiving the regeneration gas stream from the vessels 16, 18 and 20. The conduits 68, 70 and 72 are connected to the header 66 and to the conduits 36, 38 and 40. Valves 74, 75 and 78 are disposed in the conduits 68, 70 and 72 respectively. The header 66 is connected to the inlet of a conventional gas stream cooler 80, and the outlet of the cooler 80 is connected to a conduit 82 which is in turn connected to a conventional gas liquid separator 84. Liquids condensed in the gas cooler 80 accumulate in the separator 84 and are removed therefrom by way of a conduit 86 having a conventional liquid level control valve 88 disposed therein. The gas outlet connection of the separator 84 is connected to a conventional gas booster or compressor 90 by a conduit 92. The discharge of the compressor 90 is connected to the inlet of the heating coil 52 of the heater 50 by a conduit 94.

A closed cooling gas stream circuit is provided comprised of a cooling gas stream inlet header 100 which is connected to the vessels 16, 18 and 20 by way of conduits 102, 104 and 106. The conduits 102, 104 and 106 are connected to the conduits 28, 30 and 32, and valves 108, 110 and 112 are disposed in the conduits 102, 104 and 106 respectively. A cooling gas stream outlet header 114 is provided for receiving the cooling gas stream from the vessels 16, 18 and 20. The header 114 is connected by conduits 116, 118 and 120 to the conduits 36, 38 and 40 respectively. Valves 122, 124 and 126 are disposed in the conduits 116, 118 and 120. The header 114 is connected to a gas booster or compressor 115 which is in turn connected to a conventional gas cooler 128 by a conduit 117. The outlet of the gas cooler 128 is connected to the inlet of a vapor-liquid contact vessel 130 by a conduit 119. The vapor-liquid contact vessel 130 may be of a conventional design which will bring about intimate contact between vapor passing upwardly therethrough and liquid passing downwardly. A liquified selected adsorbable material is passed into the top portion of the vessel 130 by way of a conduit 132 and removed from the bottom portion of the vessel 130 by way of a conduit 134. As will be understood by those skilled in the art, liquified selected adsorbable material is continuously circulated through the vessel 130 by means of a pump (not shown). The cooling gas stream passing through the vessel 130 exits by way of a conduit 136 which is connected to the cooling gas stream inlet header 100.

The various valves described above may be any of a variety of pneumatically, hydraulically or electrically operated control valves, either two way or three way, or combinations of check valves as well as two way or three way valves may be used. The sequential opening and closing of the valves is automatically controlled by a controller which may be any of a variety of conventional cycle controllers, either time or temperature actuated. The cycle controller functions to open certain of the valves and close others at the beginning of each cycle so that the flow patterns of the main gas, regeneration gas and cooling gas streams are successively changed in a predetermined manner which will be described further hereinbelow.

The regeneration gas and cooling gas stream circuits illustrated in FIG. 2 are of the closed type. The term "closed" when referring to these circuits is used herein to mean systems of conduits, gas boosters, valves, etc. wherein gas streams are continuously circulated without the continuous addition or removal of gas. As will be understood, other types of regeneration and cooling gas stream circuits known in the art as "open" circuits may be utilized wherein gas is continuously added to and removed from the circuits. Further, where closed circuits of the type illustrated and described above are used, apparatus may be provided (not shown) for maintaining the gas volume circulated at a relatively constant level. Commonly, the cooling gas circuit is equalized with the main residue gas stream by means of a conventional pressure controller for this purpose.

The regeneration gas circuit illustrated in FIG. 2 includes a gas cooler 80 and liquid separator 84 for condensing and separating desired components removed from the inlet gas stream. If the components removed from the inlet gas stream are of the non-condensible type, the liquid separator 84 is omitted and the recovered non-condensible components are removed from the regeneration gas circuit in vapor form.

While three vessels containing beds of solid adsorbent material have been described, it will be understood that a variety of systems may be utilized for carrying out the improved process of the present invention, which systems may utilize any number of adsorbent beds. The gas stream coolers 80 and 128 are conventional gas stream cooler apparatus which function to cool the regeneration gas and cooling gas streams to desired temperature levels. Commonly, atmospheric air or water cooled apparatus are used. The gas heater 50 may be any conventional gas stream heater apparatus which will function to raise the temperature level of the regeneration gas stream passing through the heating coil 52 thereof to the desired level.

OPERATION OF THE SYSTEM 10

An inlet gas stream, such as natural gas or refinery gas containing desired components to be recovered, such as hydrocarbon compounds, flows into the system 10 by way of conduit 12 and through one of the vessels 16, 18 or 20. Let it be assumed that the adsorbent bed contained within the vessel 16 is adsorbing desired components from the inlet gas stream. The inlet gas stream flows by way of valve 22 and conduit 28 into the vessel 16. In passing through the vessel 16, the inlet gas stream contacts the solid adsorbent bed contained therein so that desired components are adsorbed on the bed and removed from the gas stream. Additionally, in accordance with the present invention a selected adsorbable material such as water vapor previously adsorbed on the bed is desorbed as the desired components are adsorbed thereon. The residue gas stream exiting from the vessel 16, which is substantially free of desired components and which contains the desorbed selected adsorbable material, passes through the conduit 36 and valve 42 into the header 34. From the header 34 the residue gas stream is removed from the system 10 by way of conduit 48 and conduit 30. The heated regeneration gas stream flowing through the adsorbent bed contained within the vessel 18 heats the adsorbent material and causes desired components previously adsorbed thereon to be desorbed into the regeneration gas stream. The regeneration gas stream containing the desorbed components flows from the vessel 18 by way of conduit 38, conduit 70 and valve 76 into the regeneration gas stream outlet header 66. From the header 66, the regeneration gas stream passes into the gas cooler 80 wherein it is cooled to a temperature level such that most of the desorbed components contained therein are condensed. The regeneration gas stream and condensed components then pass through conduit 82 into liquid separator 84 wherein the liquid components are separated and removed by way of conduit 86. The remaining regeneration gas stream exits the liquid separator 84 and passes by way of the conduit 92 to the compressor 90. The compressor 90 functions to boost the regeneration gas stream, i.e., raise the pressure thereof, so that it is circulated through the regeneration gas stream circuit. From the compressor 90 the regeneration gas stream passes by way of conduit 94 into the heating coil 52 of the heater 50. While within the heating coil 52, the regeneration gas stream is heated to a desired temperature level, and the heated regeneration gas stream passes by way of conduit 53 back to the regeneration gas stream inlet header 55.

When an adsorbent bed has been heated and the previously adsorbed desired components desorbed therefrom, it must be cooled before it can again contact the main gas stream. Let it be assumed that the bed of adsorbed material within the vessel 20 is in the process of being cooled. The cooling gas stream is passed from the cooling gas stream inlet header 100 into the vessel 20 by way of conduit 106, valve 112, and conduit 32. The adsorbent bed contained within the vessel 20 is contacted by the cooling gas stream passing therethrough thereby cooling the bed. Further, in accordance with the present invention, the cooling gas stream contains a selected adsorbable material which is adsorbed on the adsorbent bed contained within the vessel 20 as the bed is being cooled. From the vessel 20 the heated cooling gas stream is passed into the cooling gas stream outlet header 114 by way of conduit 40, conduit 120 and valve 126. From header 114, the cooling gas stream passes through the gas booster 115 and into the gas cooler 128 wherein it is cooled to a desired temperature level. From the gas cooler 128 the cooling gas stream enters the bottom portion of the vapor-liquid contact vessel 130.

As will be understood by those skilled in the art, the selected adsorbable material mentioned above is added to the cooling gas stream as it passes through the vessel 130. The vessel 130 may contain conventional vapor-liquid contact trays which bring about intimate contact between the cooling gas stream passing upwardly and the selected adsorbable material passing downwardly therethrough, or the selected adsorbable material may simply be sprayed into the vessel 130. As previously described, the liquid adsorbable material is circulated through the vessel 130, and as it is contacted by the cooling gas stream, a portion thereof is vaporized and adsorbed so that the cooling gas stream is saturated with the material. The saturated cooling gas stream exits the vessel 130 by way of conduit 136 from where it is conducted to the cooling gas stream inlet header 100.

Any of a variety of methods and apparatus may be utilized for introducing the selected adsorbable material into the cooling gas stream and/or the adsorbent bed being cooled. However, since most adsorbent materials are damaged if contacted directly by liquid, it is generally necessary to insure that the selected adsorbable material is maintained in the vapor form as it contacts the adsorbent bed. This can be accomplished in a variety of ways, as for example, by heating the cooling gas stream a small amount after the selected adsorbable material has been added thereto.

After an adsorbent bed has been cooled and preloaded with the selected adsorbable material, it is contacted with the inlet gas stream. As the inlet gas stream passes through the adsorbent bed, desired components contained therein are adsorbed thereon. As mentioned above, the selected adsorbable material is of a type such that it is displaced from the adsorbent bed as the desired components contained in the inlet gas stream are adsorbed on the bed. The displacement or desorption of the selected adsorbable material causes heat to be taken up by the material which offsets or equalizes the heat of adsorption liberated by the adsorption of the desired components on the bed. Thus, the temperature of the adsorbent bed being contacted by the inlet gas stream is maintained at a relatively constant level thereby allowing the maximum capacity of the adsorbent bed to be utilized.

The particular selected adsorbable material which should be used in accordance with the present invention depends on the type of adsorbent material used and the particular desired components to be adsorbed. For example, if hydrocarbon compounds are to be adsorbed from a natural gas stream, an adsorbent material such as activated carbon, activated alumina, silica gel or Sorbeads may be used, and a suitable selected adsorbable material is water vapor. The heat of desorption of water vapor is approximately 1,500 Btu/lb. and the approximate heat of adsorption of hydrocarbon compounds is 300 Btu/lb. Water vapor is displaced from the above mentioned adsorbent materials by hydrocarbon compounds.

In order to present a clear understanding of the system 10 by which the improved process of the present invention may be carried out, the adsorbent bed and value sequence of the system 10 through three complete cycles are shown in Table I.

TABLE I

Adsorbent Bed and Valve Sequence for System 10

| Absorbent Bed Vessel | First Cycle | Second Cycle | Third Cycle |
|---|---|---|---|
| 16 | Absorbing | Heating | Cooling |
| 18 | Heating | Cooling | Absorbing |
| 20 | Cooling | Absorbing | Heating |
| Valves | | | |
| 22 | Open | Closed | Closed |
| 24 | Closed | Closed | Open |
| 26 | Closed | Open | Closed |
| 42 | Open | Closed | Closed |
| 44 | Closed | Closed | Open |
| 46 | Closed | Open | Closed |
| 60 | Closed | Open | Closed |
| 62 | Open | Closed | Closed |
| 64 | Closed | Closed | Open |
| 74 | Closed | Open | Closed |
| 76 | Open | Closed | Closed |
| 78 | Closed | Closed | Open |
| 108 | Closed | Closed | Open |
| 110 | Closed | Open | Closed |
| 112 | Open | Closed | Closed |
| 122 | Closed | Closed | Open |
| 124 | Closed | Open | Closed |
| 126 | Open | Closed | Closed |

The following example will serve to further illustrate the improved process of the present invention.

EXAMPLE 1

A 10 mmscf/day natural gas stream of the composition given in Table II below and at inlet conditions of 500 psia and 100°F is processed by the system 10 shown in FIG. 2 with the desired components being ethane and heavier hydrocarbon compounds.

TABLE II

COMPOSITION OF INLET GAS STREAM

| Component | Concentration (Mol Percent) |
|---|---|
| Methane | 91.0 |
| Ethane | 6.0 |
| Propane | 2.2 |
| Isobutane | 0.5 |
| n-Butane | 0.3 |
| Pentanes + | 1.0 |

20,000 pounds of charcoal adsorbent material are contained in each of the vessels 16, 18 and 20, and a cycle time of 10 minutes is used.

During a first cycle as shown in Table I, the inlet gas stream contacts the adsorbent bed contained within the vessel 16 and a 9.5 mmscf/day residue gas stream is produced which is withdrawn from the system 10 by way of the conduit 48.

Simultaneously, the adsorbent bed contained within the vessel 18 is contacted with a 23 mmscf/day regeneration gas stream at an inlet temperature of 600°F. The regeneration gas stream containing desorbed components exits the vessel 18 at an initial temperature of 100°F, reaching a maximum temperature of 550°F. The regeneration gas stream is cooled to a temperature of 100°F by the gas cooler 80 resulting in about 211,300 gallons/day of condensed liquid which is removed from the separator 84.

A 25 mmscf/day stream of cooling gas is simultaneously passed into the vessel 20 at a temperature of 100°F. The cooling gas stream contains a water mist which is adsorbed on the adsorbent bed contained within the vessel 20 as it is cooled. The cooling gas stream initially exiting the vessel 20 is at a temperature of 550°F and reaches a minimum temperature of 120°F. A total of 150 pounds of water is adsorbed on the adsorbent bed contained within the vessel 20 during the cooling thereof, and the adsorbent bed is cooled to an average temperature of 100°F. During the second cycle as shown in Table I, the inlet gas stream is passed through the vessel 20. During the cycle 730 pounds of hydrocarbon compounds are adsorbed on the adsorbent bed contained within the vessel 20 and 120 pounds of the previously adsorbed water are displaced from the adsorbent bed. A total heat of adsorption of approximately 1,334,000 btu/hr is liberated in the adsorbent bed due to the adsorption of the hydrocarbon compounds, and a total of 1,090,000 btu/hr of heat is taken up as heat of desorption by the displaced water. Thus, the temperature of the adsorbent bed within the vessel 20 is maintained at a relatively constant level and the maximum adsorption capacity of the bed is utilized.

The present invention, therefore, is well adapted to carry out the objects and attain the advantages mentioned as well as those inherent therein. While presently preferred embodiments of the invention are given for the purpose of disclosure, numerous changes can be made which will readily suggest themselves to those skilled in the art and which are encompassed within the spirit of the invention disclosed and claimed herein.

What is claimed is:

1. In a sequential three-step process for the adsorption of alkanes having two to about five carbon atoms per molecule from an inlet gas stream comprising said alkanes plus methane wherein:

1. a bed of solid adsorbent material is contacted with the inlet gas stream so that the alkanes having two to about five carbon atoms contained in the inlet gas stream are adsorbed on the bed;
2. the bed is regenerated by contacting with a heated regeneration gas stream so that the adsorbed alkanes having two to about five carbon atoms are desorbed from the bed; and
3. the bed is cooled by contacting with a cooling gas stream prior to again being contacted with the inlet gas stream;

the improvement which comprises:

contacting said bed during the cooling step with water vapor, the water vapor having the property of being displaced from the bed by the alkanes having two to five carbon atoms during contacting of the inlet gas stream and the bed and having a heat of desorption equal to or greater than the heat of adsorption of the alkanes having two to about five carbon atoms on a weight per weight basis so that when the bed is contacted with the inlet gas stream the water vapor is displaced by the alkanes having two to about five carbon atoms thereby maintaining the temperature of the bed at a relatively constant level.

2. The process of claim 1 wherein the adsorbent material is selected from the group consisting of activated carbon, activated alumina, silica gel and Sorbeads.

3. An improved cyclic vapor adsorption process for the adsorption of alkanes having two to about five carbon atoms per molecule from an inlet gas stream comprising the alkanes plus methane which comprises the steps of:

contacting one of a plurality of solid adsorbent beds with the inlet gas stream so that the alkanes contained therein are adsorbed on said bed and water vapor, previously adsorbed on said bed having a heat of desorption equal to or greater than the heat of adsorption of said alkanes on a weight per weight basis, is displaced from said bed thereby maintaining the temperature of the bed at a minimum level;

simultaneously contacting another of the beds with a heated regenerated gas stream so that the alkanes are desorbed therefrom;

simultaneously contacting yet other of the beds with a cooling gas stream containing the water vapor so that the bed is cooled and the water vapor is adsorbed on the bed preparatory to being contacted with said inlet gas streams; and cycling the inlet gas stream, regeneration gas stream, and cooling gas stream containing water vapor so that the bed just contacted with said inlet gas stream is contacted with said regeneration gas stream, the bed just contacted with said cooling gas stream containing water vapor is contacted with said inlet gas stream and the bed just contacted with said regeneration gas stream is contacted with the cooling gas stream containing water vapor.

4. The process of claim 3 wherein the solid adsorbent is selected from the group consisting of activated carbon, activated alumina, silica gel and Sorbeads.

* * * * *